(12) United States Patent
Tachibana et al.

(10) Patent No.: US 7,181,850 B2
(45) Date of Patent: Feb. 27, 2007

(54) SABER SAW HAVING BLADE TILTABLE TOWARD WORKPIECE RELATIVE TO SAW BODY WHEN CUTTING

(75) Inventors: Toshihiko Tachibana, Hitachinaka (JP); Yuuichi Satou, Hitachinaka (JP); Yukio Terunuma, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 63 days.

(21) Appl. No.: 10/886,593

(22) Filed: Jul. 9, 2004

(65) Prior Publication Data
US 2005/0044729 A1 Mar. 3, 2005

(30) Foreign Application Priority Data
Jul. 11, 2003 (JP) .............. P2003-195526

(51) Int. Cl.
*B27B 3/12* (2006.01)
(52) U.S. Cl. ............................. 30/393; 83/394
(58) Field of Classification Search .......... 30/392–394, 30/501–503, 503.5, 208–214, 226–220; 83/646–647, 83/647.5
See application file for complete search history.

(56) References Cited

U.S. PATENT DOCUMENTS

| | | | | |
|---|---|---|---|---|
| 2,775,272 A | * | 12/1956 | Papworth | 30/393 |
| 4,238,884 A | * | 12/1980 | Walton, II | 30/393 |
| 4,262,421 A | * | 4/1981 | Bergler et al. | 30/393 |
| 4,272,996 A | * | 6/1981 | Sauerwein | 74/50 |
| 4,628,605 A | * | 12/1986 | Clowers | 30/393 |
| 4,870,755 A | * | 10/1989 | Schnizler | 30/123.3 |
| 5,205,043 A | * | 4/1993 | Batt et al. | 30/393 |
| 5,644,846 A | * | 7/1997 | Durr et al. | 30/393 |
| 6,282,797 B1 | | 9/2001 | Osada et al. | |
| 6,634,107 B2 | | 10/2003 | Osada | |
| 2004/0045425 A1 | * | 3/2004 | Houben et al. | 83/698.71 |

FOREIGN PATENT DOCUMENTS

| | | |
|---|---|---|
| JP | 51-130983 | 11/1976 |
| JP | 2000-263504 | 9/2000 |
| JP | 2002-079417 | 3/2002 |

\* cited by examiner

*Primary Examiner*—Kenneth E. Peterson
*Assistant Examiner*—Phong Nguyen
(74) *Attorney, Agent, or Firm*—Antonelli, Terry, Stout and Kraus, LLP.

(57) ABSTRACT

A light weight saber saw with reduced numbers of mechanical components and capable of preventing liquid and dust from entering interior of a housing. A plunger reciprocates only in its axial direction in conformity with a longitudinal direction of the housing. A blade holding portion is pivotally movably connected to a front end of the plunger. The blade holding portion includes a plunger chip through which a rear end of a blade is insertable, and a blade holder covering the plunger chip. The blade holder has a track side corresponding to tooth side of the blade, and a track having an inclined track surface is provided at the track side. The housing rotatably supports a roller in rolling contact with the track surface. When the blade is retractingly moved into the housing, the blade holding portion and the blade are pivotally moved totether toward a workpiece by the contact between the roller and the track surface.

7 Claims, 10 Drawing Sheets

SABER SAW HAVING BLADE TILTABLE TOWARD WORKPIECE RELATIVE TO SAW BODY WHEN CUTTING

BACKGROUND OF THE INVENTION

The present invention relates to a saber saw, and more particularly, to a saber saw that inclines the front end of a blade to a workpiece when the blade withdraws toward a housing so as to make sawtooth further cut into the workpiece to increase sawing efficiency.

Saber saws are reciprocating type cut-off tools driven by an electric-powered motor, which are used to cut off woody and steel workpieces, pipes, etc. in constructing residences and buildings, or furnishing, remodeling, and scrapping works. As is generally known, a saber saw cuts off a workpiece to be sawed by reciprocating a reciprocation shaft (hereinafter simply referred to as a plunger) which has a straight sawtooth (hereinafter simply referred to as a blade) attached to the leading end of the plunger.

In view of motion of the plunger in sawing operation, saber saws are classified into the first and second types. According to the first type, a plunger simply reciprocates along its axis direction. According to the second type, a plunger reciprocates as well as wobbles upward and downward so that sawtooth of the blade can further cut into a workpiece to facilitate sawing operation. The sawing operation in which the blade moves under the motion combining the reciprocating motion and the wobbling motion in cutting off a workpiece is referred to as orbital sawing operation.

FIG. 16 shows a partly cross-sectional view of a conventional saber saw 401 for use in performing the orbital sawing operation. When a drive gear 412 that is concentrically arranged on a rotor of a motor rotates, a secondary shaft 413 rotates with reduced speed through a driven gear 414. The secondary shaft 413 is integrally provided with an eccentric cylinder shaft 413A, and a recipro-plate or reciprocating-plate 418 is attached to the secondary shaft 413 for converting rotational motion to reciprocating motion. A saber saw body 402 has attached thereto an elongated guide sleeve 421 of irregular-shaped cross-section. The guide sleeve 421 is pivotally movable about a supporting pin 422. Inside the guide sleeve 421, A plunger 420 is slidably movable relative to an inner peripheral surface of the guide sleeve 421. The plunger 420 has a leading end provided with a blade 19. The plunger 420 is connected to a spherical portion 418B of the swinging recipro-plate 418. Upon rotation of the secondary shaft 413, the recipro-plate 418 swings backward and forward, which permits the plunger 420 to reciprocate along its longitudinal axis. At the rear end of the guide sleeve 421, a linking plate 423 extends downward. A free end of the linking plate 423 is positioned in contact with the eccentric cylinder shaft 413A.

In sawing operation, sawing reaction force F1 applied to the blade 19 causes the rear end of the guide sleeve 421 to pivotally move downward about the supporting pin 422, and thus the lower end of the linking plate 423 is pressed against the eccentric cylinder shaft 413A. So, when the eccentric cylinder shaft 413A rotates in consequence of rotation of the secondary shaft 413, the rear end of the guide sleeve 421 is pushed upward by the linking plate 423. As a result, the plunger 420 reciprocates as well as wobbles upward and downward through the guide sleeve 421.

An elliptical orbit as shown in FIG. 17 is provided as a moving locus of the tip end of the blade 19 that moves under the motion combining the reciprocating motion and the wobbling motion when the phase angle of the eccentric cylinder shaft 413A against the plunger 420 is desirably set up. The sawing operation in which the blade 19 forms an elliptical orbit is referred to as the orbital sawing operation. In the orbital sawing operation, when the blade 19 is withdrawn toward the saber saw body 402, the blade 19 moves into a workpiece W, which significantly increases sawing efficiency especially in sawing a comparatively tender workpiece such as a woody material. Above-described conventional saber saws are disclosed in laid open Japanese Patent Application Publication Nos. S51-130983, 2000-263504, and 2002-79417.

In the conventional saber saw 401, so as to make the plunger 420 reciprocate along its axial direction as well as wobble upward and downward, the prolonged and irregular-shaped guide sleeve 421 is required. Being long and of irregular shape, the guide sleeve 421 becomes heavy and requires troublesome works in production, which undesirably makes the whole saber saw 401 heavy and requires high production cost. Furthermore, so as to make the guide sleeve 421 wobble, a gap is provided between the saber saw body 402 and the guide sleeve 421. However, cutting chips and water may be entered into the saber saw body 402 through the gap. The cutting chips are brought about when sawing a workpiece, and water droplets are brought about when sawing an existing water pipe containing water. This undesirably leads to abrasion and corrosion of internal parts and therefore shortens the service life of the saber saw 401. In order to avoid this problem, a cylinder-shaped seal member 421A made of a special rubber material is interposed in the gap as shown in FIG. 16. However, because the seal member 421A is made from a special material production cost is increased. Further, assembly cost is also increased. Furthermore, since the seal member 421A is repeatedly deformed when the guide sleeve 421 wobbles, there is raised problem from the viewpoint of durability.

SUMMARY OF THE INVENTION

It is therefore an object of the present invention to provide a saber saw of simplified configuration capable of reducing the number of components and parts, and lowering the total weight.

Another object of the present invention is to provide such a saber saw capable of preventing cutting chips and liquid droplets from entering interior of the saber saw body to thus prolong service life.

These and other objects of the present invention will be attained by a saber saw includes a housing, a drive source disposed in the housing, a plunger, a conversion mechanism, a blade holding portion, and an inclined motion mechanism. A liner blade has one longitudinal side and another longitudinal side, and tooth are formed at least at the one longitudinal side for cutting a workpiece. The plunger is linearly reciprocally movably supported in the housing. The reciprocating direction of the plunger is only an extending direction of the plunger. The conversion mechanism is adapted for converting a rotation of the motor into a reciprocating motion of the plunger. The blade holding portion has a rear side pivotally movably connected to the front side of the plunger for holding a rear portion of the blade. The inclined motion mechanism forces a leading end portion of the blade to be inclined toward the workpiece when the blade is retractingly moved into the housing. The blade holding portion is pivotally moved in a direction of the inclination of the leading end portion of the blade. The inclined motion mechanism includes first and second inclined motion regulating portions. The first inclined motion regulating portion is provided at an inner peripheral surface of the front side of the housing and at a side corresponding to the another longitudinal side of the blade. The second inclined motion regulating portion is disposed at the blade holding portion and is abutable on the first inclined motion regulating portion for regulating a pivot angle of the blade holding portion with respect to the plunger when the blade is retractingly moved into the housing while the blade is subjected to reaction force from the workpiece as a result of actual cutting.

DETAILED DESCRIPTION OF THE PREFERRED EMBODIMENTS

Figure 1:
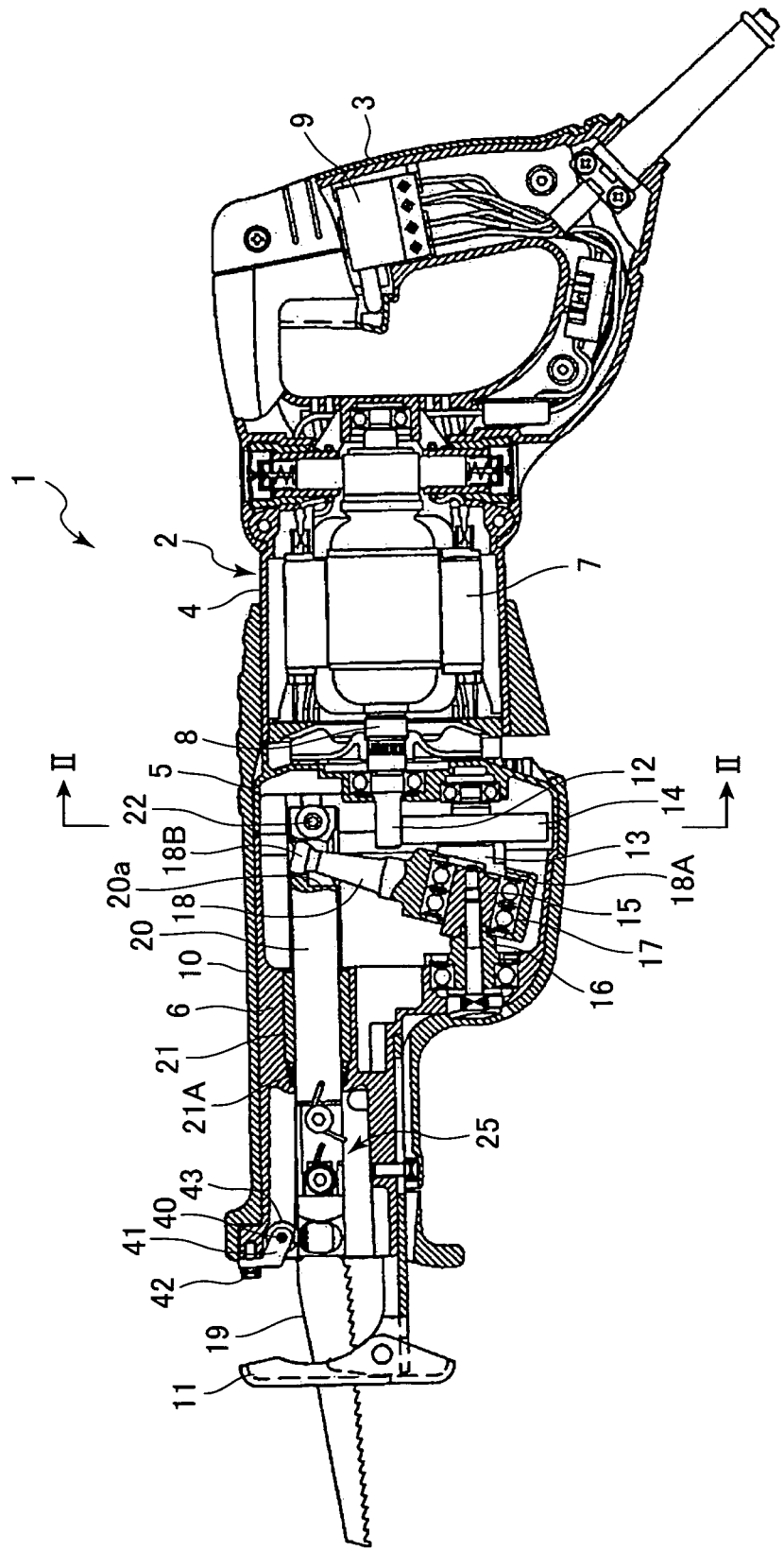
FIG. 1 is a partial cross-sectional side view showing a saber saw according to a first embodiment of the present invention.

A saber saw according to a first embodiment of the present invention will be described with reference to FIGS. 1 to FIG. 12. As shown FIG. 1, a saber saw 1 has its outer contour determined by a saber saw body 2, and the saber saw body 2 includes from the rear end thereof a handle 3 made of resin, a first housing 4 made of resin located at the front end of the handle 3, a second housing 5 made of aluminum or aluminum alloy located at the front end of the first housing 4, and a third housing 6 made of aluminum or aluminum alloy located at the front end of the second housing 5. The first housing 4 houses therein an electric motor 7, and a rotor 8 of the electric motor 7 is supported by the second housing 5 through a bearing. A switch 9 is accommodated in the handle 3 for controlling supply of power to the electric motor 7. A part of the first housing 4, the second housing 5, and the third housing 6 have their outsides covered by a front cover 10 made of insulating adiabatic elastic material having a high friction coefficient. At the front end of the third housing 6, there is provided a base 11 that makes the saber saw body 2 pressed against a workpiece so as to stabilize the body 2 when sawing.

In the second housing 5, the rotor 8 has formed or fixed thereon a drive gear 12, and a secondary shaft 13 that extends in parallel with the rotor 8 is rotatably supported by the second housing 5 through a bearing. At the rear end of the secondary shaft 13, a driven gear 14 of large diameter that meshedly engages the drive gear 12 is provided concentrically with the secondary shaft 13. Thus, a speed-reducing gear mechanism is provided by the drive gear 12 and the driven gear 14 for deceleratingly transmitting rotation of the electric motor 7 to the secondary shaft 13. At the front end of the secondary shaft 13, there is provided an inclined shaft 15 that is inclined by approximately 14 degrees with respect to the axis of the driven gear 14. At the front end of the inclined shaft 15, there is fixed a sub-shaft 16 that is concentric with the driven gear 14. The sub-shaft 16 is rotatably supported by the third housing 6 through a bearing. Thus, the secondary shaft 13 has its rear end supported by the second housing 5 and has its front end supported by the third housing 6, and is rotatable about its axis.

A recipro-plate or reciprocating-plate 18 is provided to the inclined shaft 15 arranged on the secondary shaft 13 through two bearings 17. The reciprocating plate 18 is provided with a swing shaft 18A and a spherical portion at the free end of the swing shaft 18A. The spherical portion 18B of the recipro-plate 18 is coupled to an elongated plunger 20 that reciprocates a blade 19 positioned at the front end of the saber saw body 2.

Figure 2:
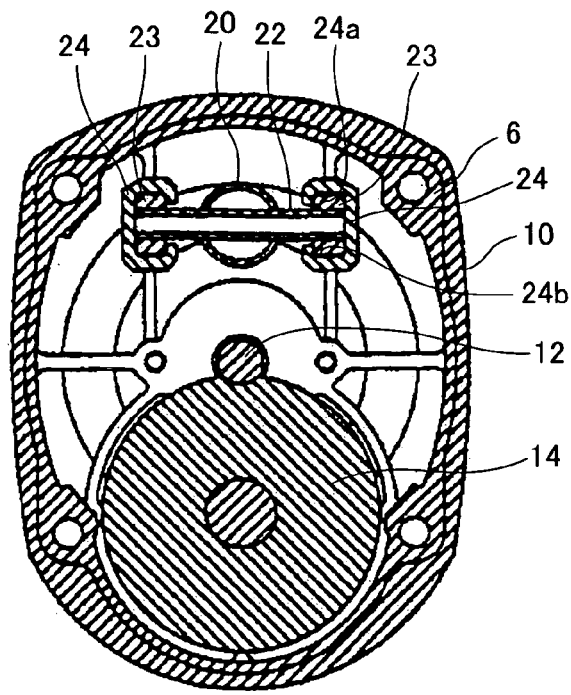
FIG. 2 is a cross-sectional view taken along the line II—II of FIG. 1.

At part of the inner peripheral surface of the third housing 6, there is fixed a cylinder-shaped bearing metal 21 extending in parallel with the axis of the rotor 8 of the electric motor 7. The plunger 20 passes through and is supported by the bearing metal 21 so that the plunger 20 can slide to reciprocate inside the bearing metal 21 along the longitudinal direction thereof. At the front end of the bearing metal 21, a seal ring 21A such as an O-ring is interposed between the inner peripheral surface of the third housing 6 and the outer peripheral surface of the plunger 20 so as to seal mechanical parts inside the second and third housings 5, 6. Thus, invasion of liquid or dust into the interior of the second and third housings 5, 6 can be prevented. As shown in FIG. 2, a roller shaft 22 penetrates the plunger 20 along its diametrical direction, and is fixed to or rotatably supported by the plunger 20. To both ends of the roller shaft 22, rollers 23 are rotatably attached. Furthermore, inside the third housing 6, a pair of tracks 24 are fixed to the third housing 6 and extend in parallel with the axial direction of the plunger 20 for guiding the rollers 23. Each of the tracks 24 has track surfaces 24a and 24b facing each other. The track surfaces 24a and 24b extend in parallel with each other, and the distance between the confronting track surfaces 24a and 24b is slightly larger than an outer diameter of the roller 23.

The plunger 20 is formed with a concave portion 20a, as shown in FIG. 1, and the spherical portion 18B of the recipro-plate 18 engages with the concave portion 20a. Accordingly, when the electric motor 7 rotates and the recipro-plate 18 swings backward and forward, then the plunger 20 is made to reciprocate along its axial direction. At this time, since the pair of the rollers 23 connected to the plunger 20 is guided by the pair of the tracks 24, rotation of the plunger 20 about its axis is prevented, and thus lateral inclination of the reciprocating blade 19 can be prevented.

Figure 3:
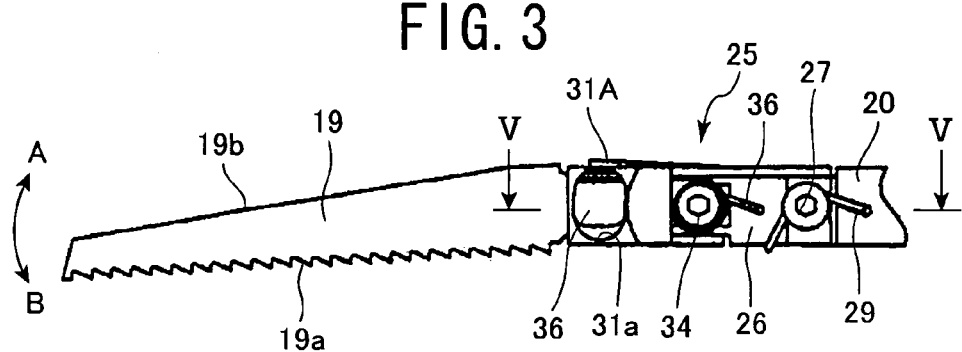
FIG. 3 is a side view showing an essential portion of the saber saw according to the first embodiment.
Figure 4:
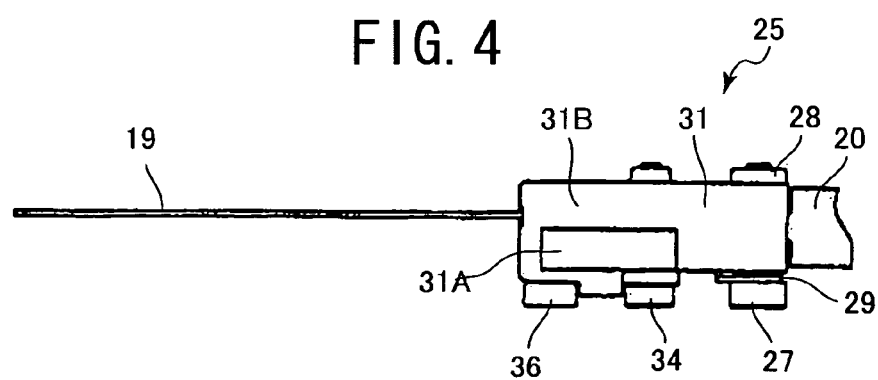
FIG. 4 is a plan view showing the essential portion shown in FIG. 3.
Figure 5:
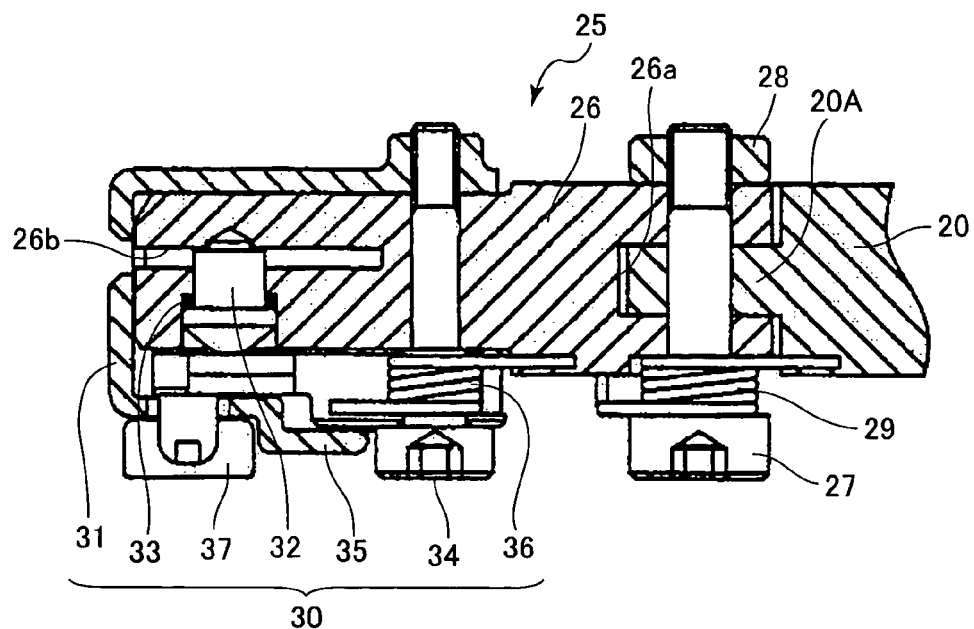
FIG. 5 is a cross-sectional view taking along the line V—V of FIG. 3 and showing a blade holding portion of the saber saw according to the first embodiment.

Next, configuration of a blade holding portion 25 will be described. As shown in FIG. 3, the blade holding portion 25 is coupled to the leading end of the plunger 20, and is pivotable along an arrow "AB" direction. As shown in FIG. 3 to FIG. 5, the blade holding portion 25 includes a plunger chip 26, a stepped bolt 27, a nut 28, a torsion spring 29, and a blade attachment/detachment mechanism 30. A concave portion 26a is formed at the rear end of the plunger chip 26 as shown in FIG. 5, and a convex portion 20A protruding from the leading end of the plunger 20 engages the concave portion 26a. The stepped bolt 27 extends through the concave portion 26a as well as the convex portion 20A, and the leading end of the stepped bolt 27 is threadingly engaged with the nut 28. Thus, the plunger chip 26 is coupled to the plunger 20, and is pivotable around a stem portion of the stepped bolt 27. The torsion spring 29 is disposed around the stem of the stepped bolt 27, and has its one end fixed to the plunger 20 and another end fixed to the plunger chip 26 to bias the plunger chip 26 in the "A" direction (FIG. 3) all the time. The "A" direction is the direction of a back side 19b of the blade 19 that is opposite to a tooth side 19a, that is, the direction in which the leading end of the blade 19 is urged away from a workpiece.

Figure 6:
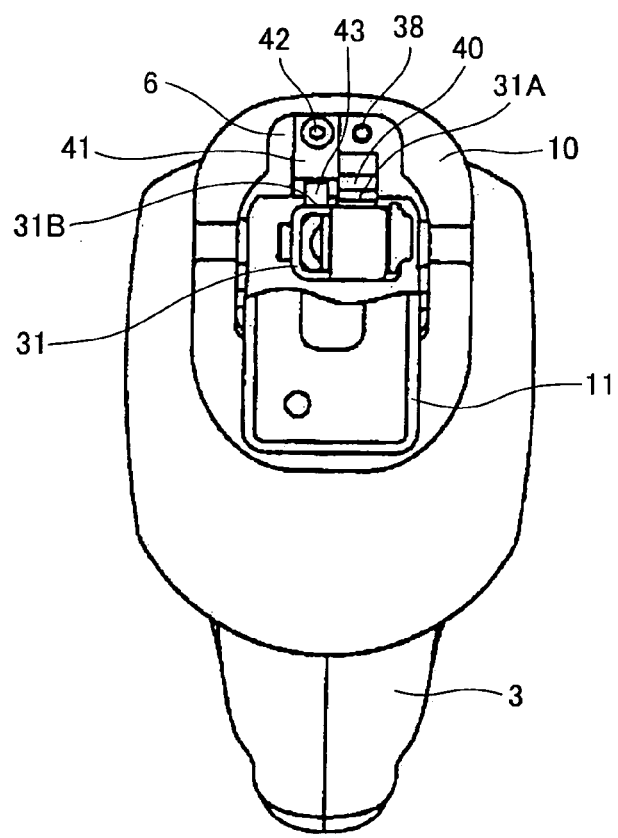
FIG. 6 is a front view showing an essential portion of an inclined motion mechanism and showing a state where a roller is in abutment with a track surface of a second track in the saber saw according to the first embodiment.
Figure 7:
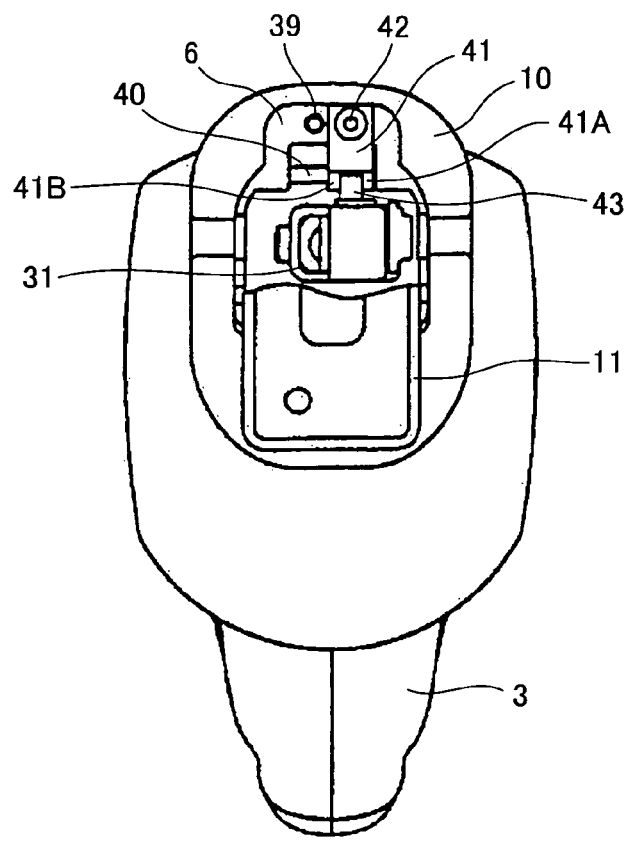
FIG. 7 is a front view showing an essential portion of an inclined motion mechanism in the saber saw according to the first embodiment, and showing a state where the roller is in abutment with a track surface of a first track.

The blade attachment/detachment mechanism 30 is provided at the front side of the plunger chip 26, and a slit 26b is formed at the leading end of the plunger chip 26. The slit 26b allows the rear end of the blade 19 to be inserted therethrough. The blade attachment/detachment mechanism 30 includes a blade holder 31, a retaining pin 32, a compression coil spring 33, a fastening bolt 34, a pressure lever 35, a torsion spring 36, and an operation knob 37. The blade holder 31 covers the front side of the plunger chip 26 and holds rear longitudinal end portion of the blade 19 from upward and downward directions, as shown in FIG. 6 and FIG. 7, so as to fixedly secure the blade 19 to the plunger chip 26. The retaining pin 32 is engageable with a circular hole 19c shown in FIG. 11 formed at the rear side of the blade 19 to retain the blade 19 when the blade 19 is inserted into the slit 26b. The compression coil spring 33 is adapted to bias the retaining pin 32 in a direction to remove the retaining pin 32 from the slit 26b. The fastening bolt 34 extends through the plunger chip 26 to fix the blade holder 31 to the plunger chip 26. The pressure lever 35 is pivotably supported by the fastening bolt 34 to presses the head of the retaining pin 32 against the biasing force of the compression coil spring 33 so as to permit the retaining pin 32 to maintain engagement with the circular hole 19c when the pressure lever 35 is pivotally moved to a pressing position. The torsion spring 36 is adapted for urging the pressure lever 35 to its pressing position. The operation knob 37 is provided at the free end of the pressure lever 35. Incidentally, the pressure lever 35 has a contact surface in contact with the retaining pin 32. The contact surface is tapered so that the retaining pin 32 gradually moves to the slit 26b corresponding to pivot angle of the pressure lever 35. The blade holder 31 is formed with a slot 31a (FIG. 3), and the operation knob 37 is located in the slot 31a to regulate pivot angle of the operation knob 37. The blade attachment/detachment mechanism 30 is disclosed in a commonly assigned co-pending U.S. patent application Ser. No. 10/338,674 filed Jan. 9, 2003, a disclosure of which is incorporated by reference.

On the upper surface of the blade holder 31 covering the plunger chip 26, the upper surface being corresponding to the back side 19b of the blade 19, there are provided a first track 31A and a second track 31B that are parallel with each other and extend along the axial direction of the plunger chip 26, or the longitudinal direction of the blade 19. The first track 31A protrudes toward the inner surface of the third housing 6, and is tapered so that the height is largest near the front end of the plunger chip 26 and is gradually reduced as getting near to the rear end of the plunger chip 26, as shown in FIG. 3. On the other hand, the second track 31B is flatly formed.

As shown in FIGS. 6 and 7, a couple of female threads 38, 39 are formed at the front open end of the third housing 6. The female threads 38, 39 are arrayed in a thickness direction of the blade 19. Further, a roller shaft 40 is positioned inside the front open end of the third housing 6 and extends in the thickness direction of the blade 19. The roller shaft 40 is fixed to the inner surface of the third housing 6 by force-fitting. A roller holder 41 is detachably supported to the third housing 6. That is, a male screw 42 penetrates the roller holder 41 and is selectively threadingly engageable with either of the female threads 38, 39. The roller holder 41 is provided with regulating portions 41A, 41B those being slidable on the roller shaft 40. A roller 43 is held between the regulating portions 41A and 41B. The roller 43 is rotatably supported by the roller shaft 40, and is located at the front inside of the third housing 6. So as to assure free rotation of the roller 43, distance between opposing surfaces of the regulating portions 41A, 41B is slightly larger than an axial length of the roller 43.

In case the male screw 42 is threadingly engaged with the female thread 38 for fixing the roller holder 41 to the third housing 6 as shown in FIG. 7, the roller surface of the roller 43 is in abutment with a first track surface of the first track 31A. On the other hand, in case the male screw 42 is threadingly engaged with the female thread 39 as shown in FIG. 6, the roller surface of the roller 43 is in abutment with a second track surface of the second track 31B. A combination of the above-described first and second tracks 31A, 31B, roller holder 41, roller 43, and torsion spring 29 constitutes an inclined motion mechanism. The roller holder 41 and roller 43 constitute a first inclined motion regulating portion, while the first and second tracks 31A, 31B constitute a second inclined motion regulating portion.

Figure 9:
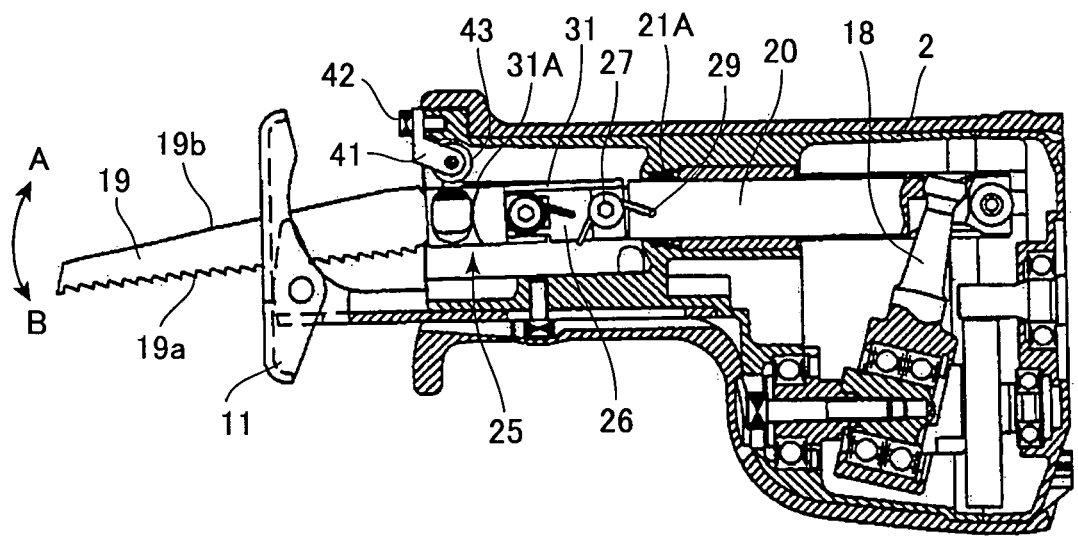
FIG. 9 is a cross-sectional view showing the saber saw according to the first embodiment and showing a state where the roller is in abutment with the track surface of the first track during retracting motion of the blade.
Figure 10:
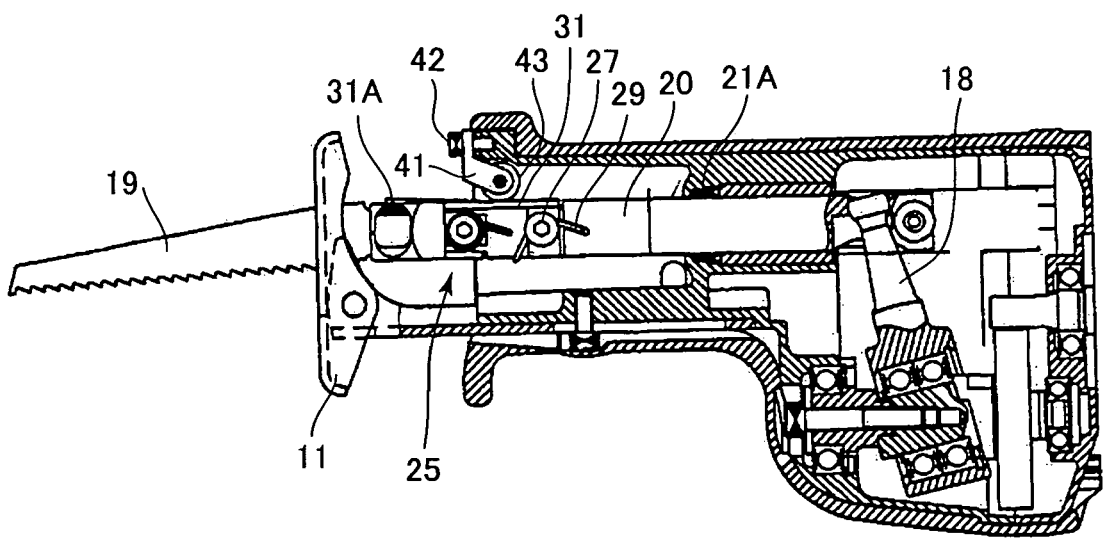
FIG. 10 is a cross-sectional view showing the saber saw according to the first embodiment and showing a state where the blade is moved to its most advancing position.
Figure 12:
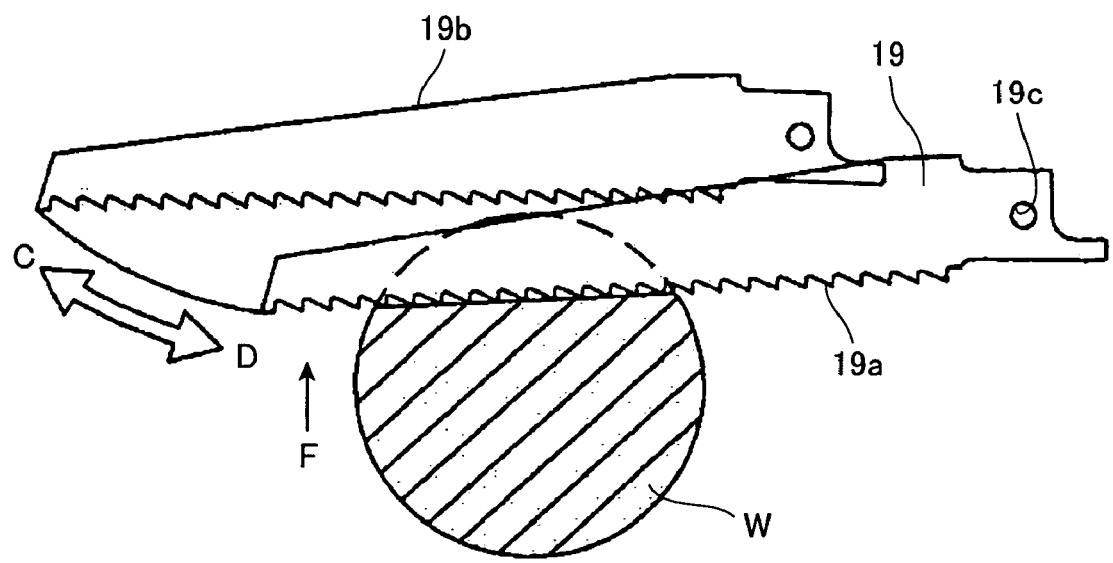
FIG. 12 is a view for description of a cutting state in the saber saw according to the first embodiment in which the blade performs a composite movement that is a combination of the reciprocating motion of the blade in the axial direction of the plunger and pivotal moving motion of the blade tip toward a workpiece during retracting motion of the blade.

With this arrangement, a moving locus of the leading end of the blade 19 as shown by an arrow CD in FIG. 12 is realized. This motion of the blade 19 is the combination of the reciprocating motion along its longitudinal direction of the blade 19 and the wobbling motion thereof toward a workpiece W at the time of moving backward, toward the body 2. To this effect, a state shown in FIGS. 7, 9 and 10 is provided. Firstly, the roller holder 41 moves along the roller shaft 40 so that the roller 43 is brought into confrontation with the first track 31A. Then, the male screw 42 is threadingly engaged with the female thread 38.

When tuning on the switch 9 after the inclined motion mechanism is thus set up, the electric motor 7 rotates, the secondary shaft 13 rotates with reduced speed through the drive gear 12 and the driven gear 14, and the recipro-plate 18 swings along the backward and forward direction of the saber saw body 2. Then, the plunger 20, with which the spherical portion 18B of the recipro-plate 18 engages, reciprocates only in the axial direction thereof along the bearing metal 21. During the reciprocating motion of the plunger 20, since the plunger 20 is guided by the tracks 24 through the roller shaft 22 and the rollers 23 as shown in FIG. 2, rotation of the plunger 20 about its axis can be prevented, and thus lateral inclination of the blade 19 can be prevented.

During such reciprocating portion of the plunger 20, the plunger 20 itself does not wobble. That is, since the plunger 20 reciprocates only in the longitudinal direction of the saber saw body 2, the configuration for supporting the plunger 20 to the saber saw body 2 can be simplified. Thus, liquid or dust can be prevented from breaking into the saber saw body 2 by only sealing the gap between the plunger 20 and the third housing 6 using a conventional O-ring 21A. So, under the simplified configuration, the problem of abrasion and corrosion of inner parts due to break-in of liquid or dust can be solved, which can extend the lifetime of a saber saw. Furthermore, since a guide sleeve for guiding the reciprocating and pivoting motion of the plunger, which must be used in the conventional saber saw, becomes unnecessary, weight corresponding to the guide sleeve can be reduced, which can reduce the overall weight as well as lower the number of components of the saber saw.

During forward movement of the blade 19, the blade 19 passes over a workpiece W with the leading end biased to pivot in the "A" direction i.e., away from the workpiece W due to the biasing force of the torsion spring 29 as shown in FIG. 3. Thus, this pivotal posture of the blade 19 prevents the blade 19 from cutting into the workpiece W, and further, pivoting stroke for the front end of the blade 19 toward the workpiece W at the time of moving backward can be obtained. FIG. 10 shows the state in which the recipro-plate 18 swings to the leftmost position, and the blade 19 protrudes to the maximum from the third housing 6.

When the plunger 20 moves backward from this state and the cutting force of the blade 19 is imparted on the workpiece W as shown in FIG. 9, the roller 43 will ride on a inclined track surface from the rear end of the first track 31A, and the blade 19 is biased upward by sawing reaction force F shown in FIG. 12. This assures abutment of the roller 43 on the inclined track surface of the first track 31A. When the blade 19 further moves backward, since the roller 43 rotates and gradually and relatively moves to the front end of the inclined track surface, the plunger chip 26 is biased to pivot in the arrow B direction against the biasing force of the torsion spring 29. This assures the motion of the front end of the blade 19 in the D direction shown in FIG. 12, facilitating the cutting-in of the sawtooth to the workpiece W when actual sawing.

Figure 8:
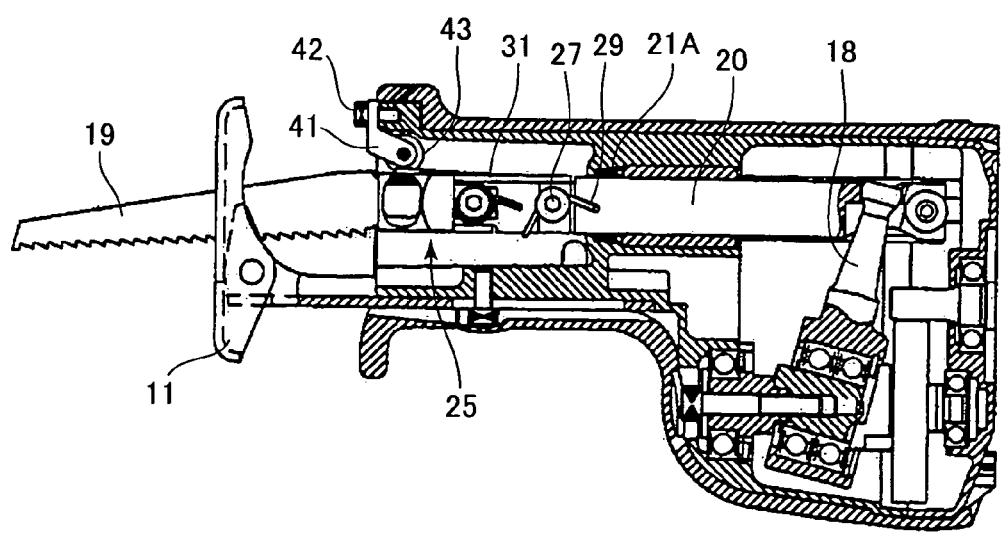
FIG. 8 is a cross-sectional view showing the saber saw according to the first embodiment and showing a state where the roller is in abutment with the track surface of the second track during retracting motion of the blade.
Figure 11:
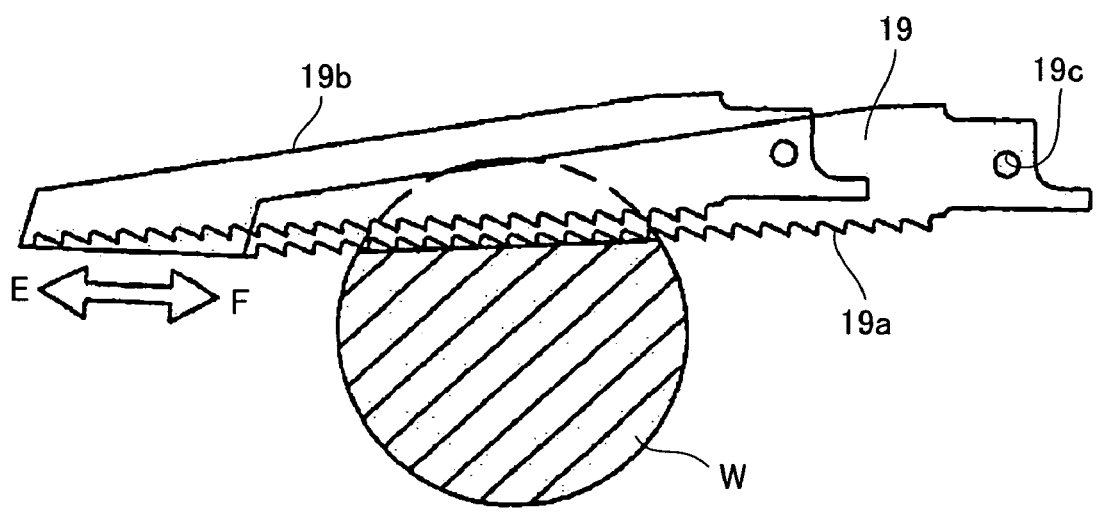
FIG. 11 is a view for description of a cutting state in the saber saw according to the first embodiment in which the blade is only linearly reciprocally moved in an axial direction of a plunger.

In order to realize a linear reciprocal motion of the leading end of the blade 19 as shown by an arrow EF in FIG. 11, that is, the reciprocating motion of the blade 19 in its longitudinal direction only, the roller holder 41 moves along the roller shaft 40 so that the roller 43 is brought into abutment with the second track 31B. To this effect, the male screw 42 is threadingly engaged with the female thread 39 as shown in FIG. 6, FIG. 8, and FIG. 10. When tuning on the switch 9 after the inclined motion mechanism is thus set up, the roller 43 abuts on the track surface of the second track 31B. In this case, since the track surface of the second track 31B is not inclined but flat, the front end of the blade 19 does not pivot toward the workpiece W when moving backward.

In this way, by switching the position of the roller 43 between two stages, two kinds of moving loci of the leading end of the blade 19 can be realized, which enables effective sawing operation in conformity with the property of the workpiece W. Furthermore, since the roller 43 is in rolling contact with one of the tracks 31A and 31B when abutting and running on either of the first track 31A and the second track 31B, the roller 43 does not impart significant resistance against the movement of the plunger chip 26, thereby realizing smooth motion of the plunger chip 26.

Next, a saber saw 101 according to a second embodiment of the present invention will be described with reference to FIG. 13 wherein like parts and components are designated by the same reference numerals as those shown in the first embodiment. In the second embodiment, a first inclined motion regulating portion is configured by an inclined guide surface 143 formed at the front inner surface of a third housing 106. The inclined guide surface 143 is gradually spaced away from the axis of the plunger 20 toward the front end of the third housing 106. On the other hand, a second inclined motion regulating portion is configured by a roller 131A rotatably supported by the blade holder 131 and abuttable on the inner surface of the third housing 106.

Figure 13:
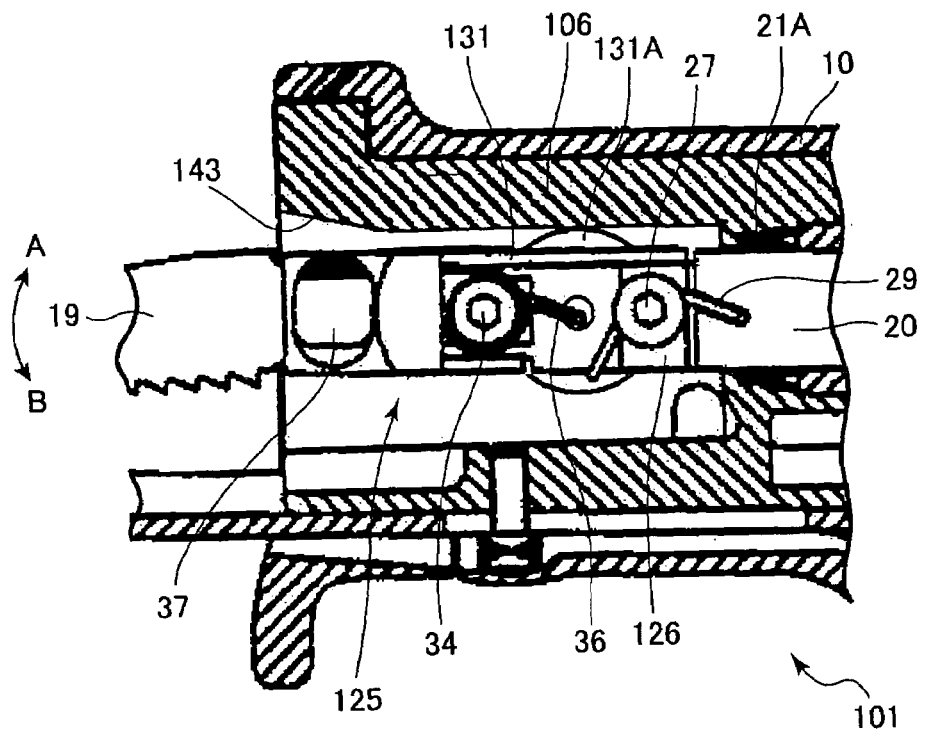
FIG. 13 is a cross-sectional view showing an essential portion of an inclined motion mechanism in a saber saw according to a second embodiment of the present invention.

FIG. 13 shows the state in which the blade 19 is at the most retracted position into the third housing 106. When the plunger 20 moves forward from this most retracted position, the roller 131A rotatingly moves to the inclined guide surface 143, whereupon then the plunger chip 126 is pivotally moved by the torsion spring 29 about the axis of the stepped bolt 27 in the direction of the arrow A shown in FIG. 13. Then when the plunger 20 moves backward from this state, the roller 131A runs along the inclined guide surface 143, so that the plunger chip 126 is pivotally moved in the direction of the arrow B against the biasing force of the torsion spring 29. Thus, the sawtooth bites into the workpiece to facilitate sawing operation.

Thus, in the saber saw 101 according to the second embodiment, since the roller 131A disposed at a blade holding portion 125 rotatingly abuts on the inclined guide surface 143 formed at the third housing 106, moving resistance of the blade holding portion 125 can be reduced by the rotation of the roller 131A.

A saber saw 201 according to a third embodiment of the present invention will next be described with reference to FIG. 14. In the third embodiment, similar to the second embodiment, a first inclined motion regulating portion is configured by the inclined guide surface 143 formed at the front inner surface of a third housing 106. The inclined guide surface 143 is gradually spaced away from the axis of the plunger 20 toward the front end of the third housing 106. On the other hand, a second inclined motion regulating portion is configured by a protrusion 231A that protrudes from the upper surface of the blade holder 231 of the blade holding portion 225 to the inner surface of the third housing 106, the upper surface being corresponding to the back side 19*b* of the blade 19. The protrusion 231A is slidable on the inclined guide surface 143.

Figure 14:
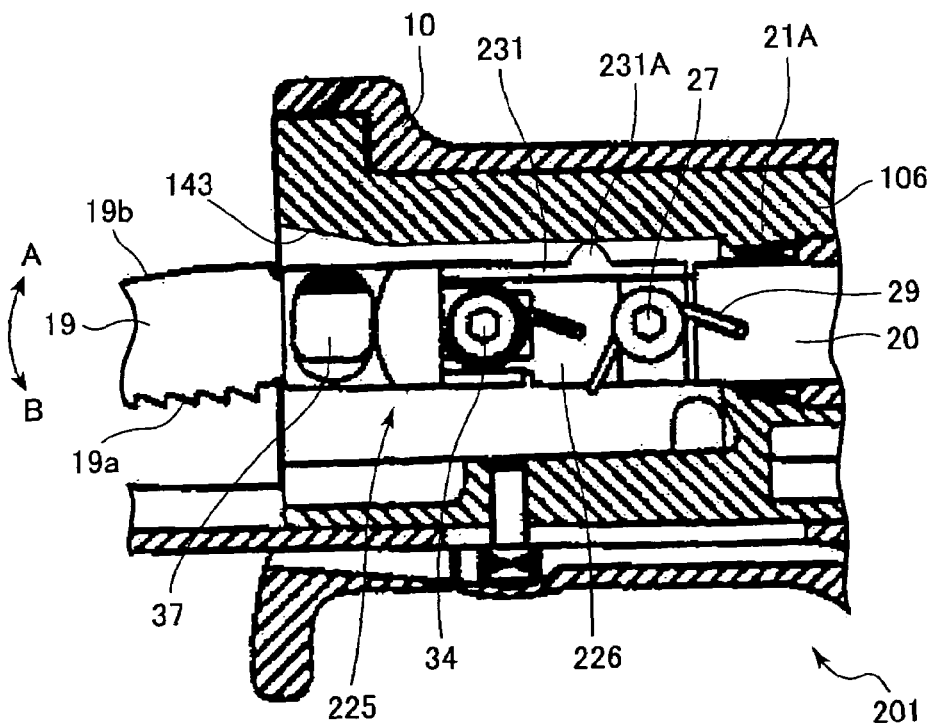
FIG. 14 is a cross-sectional view showing an essential portion of an inclined motion mechanism in a saber saw according to a third embodiment of the present invention.

FIG. 14 shows the most retracted position of the blade 19 into the third housing 106. When the plunger 20 moves forward from the most retracted position, the protrusion 231A slides on the inner surface of the third housing 106 and then moves to the inclined guide surface 143, whereupon a plunger chip 226 is pivotally moved by the biasing force of the torsion spring 29 about the axis of the stepped bolt 27 in the direction of the arrow A in FIG. 14. When the plunger 20 moves backward from this state, the protrusion 231A slides on the inclined guide surface 143, and the plunger chip 226 is pivotally moved in the direction of the arrow B against the biasing force of the torsion spring 29. Thus, the tooth side 19a can thrust into the workpiece to facilitate sawing operation.

Thus, in the saber saw 201 according to the third embodiment, overall configuration can be simplified since the protrusion 231A is formed at the blade holding portion 225, and the protrusion 231A simply slides on the inclined guide surface 143 formed at the third housing 106.

Next, a saber saw 301 according to a fourth embodiment of the present invention will be described with reference to FIG. 15. In the fourth embodiment, similar to the first embodiment, a first inclined motion regulating portion includes the roller holder 41, the male screw 42 and the roller 43. The roller holder 41 is suspended from the front inner surface of the third housing 6, and the male screw 42 is adapted for fixing the roller holder 41 to the third housing 6. The roller 43 is rotatably supported by the roller holder 41. However, the fourth embodiment is different from the first embodiment in that the fixing position of the roller 43 is restricted to one. In other words, only a single female thread is formed at the third housing 6. Further, a second inclined motion regulating portion is configured by an upper surface of the blade holder 331 of the blade holding portion 325, the upper surface being corresponding to the back side 19b of the blade 19. That is, the outer peripheral surface of the blade holder 331 itself extending in the axial direction of the plunger 20 serves as the second inclined motion regulating portion. The dimension and shape of the roller holder 41 and diameter of the roller 43 is determined such that a posture of the blade holder 331 can be maintained at a slightly pivotally moving position in the direction of the arrow A about the axis of the stepped bolt 27, that is, the blade holder 331 shown in FIG. 15 can be slightly inclined with its front end slightly upheld, when the blade 19 is at its most retracted position into the third housing 6.

Figure 15:
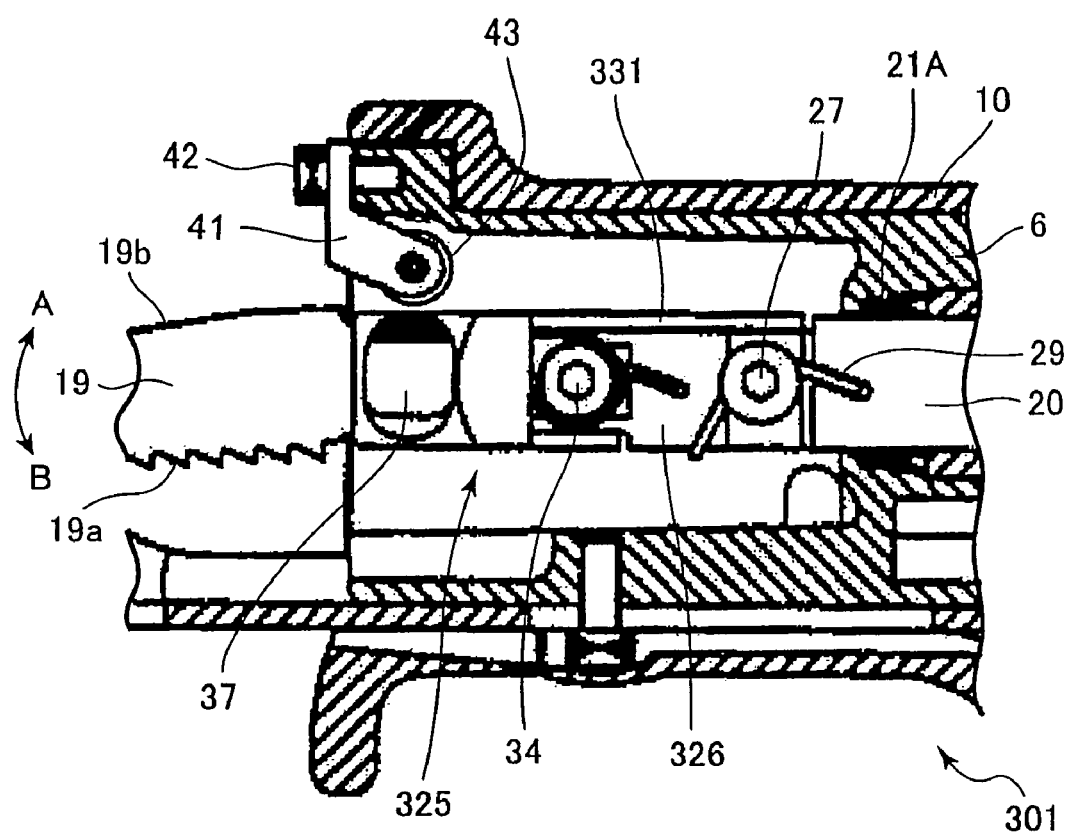
FIG. 15 is a cross-sectional view showing an essential portion of an inclined motion mechanism in a saber saw according to a fourth embodiment of the present invention.
Figure 16:
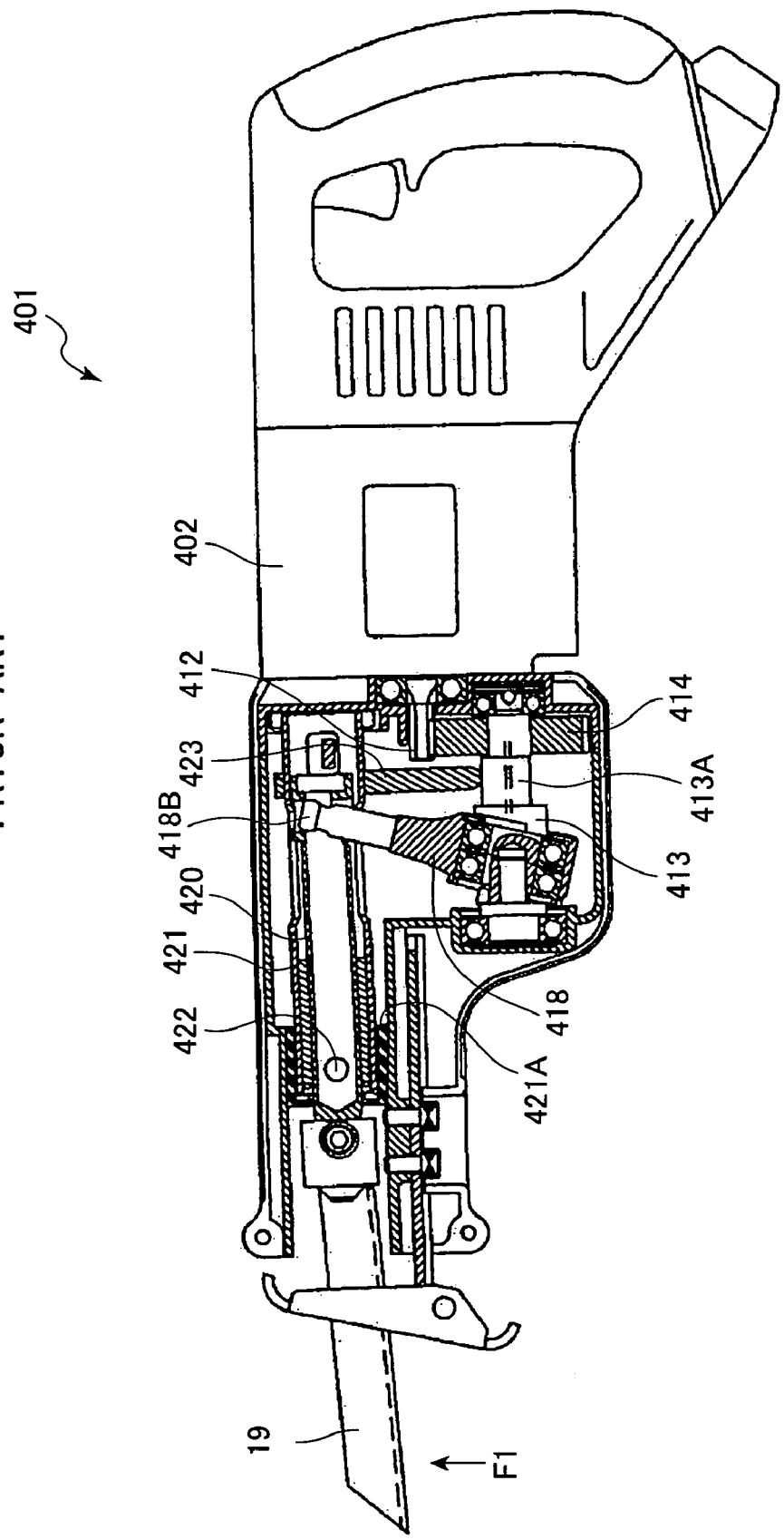
FIG. 16 is a partial cross-sectional side view showing an essential portion of a conventional saber saw.
Figure 17:
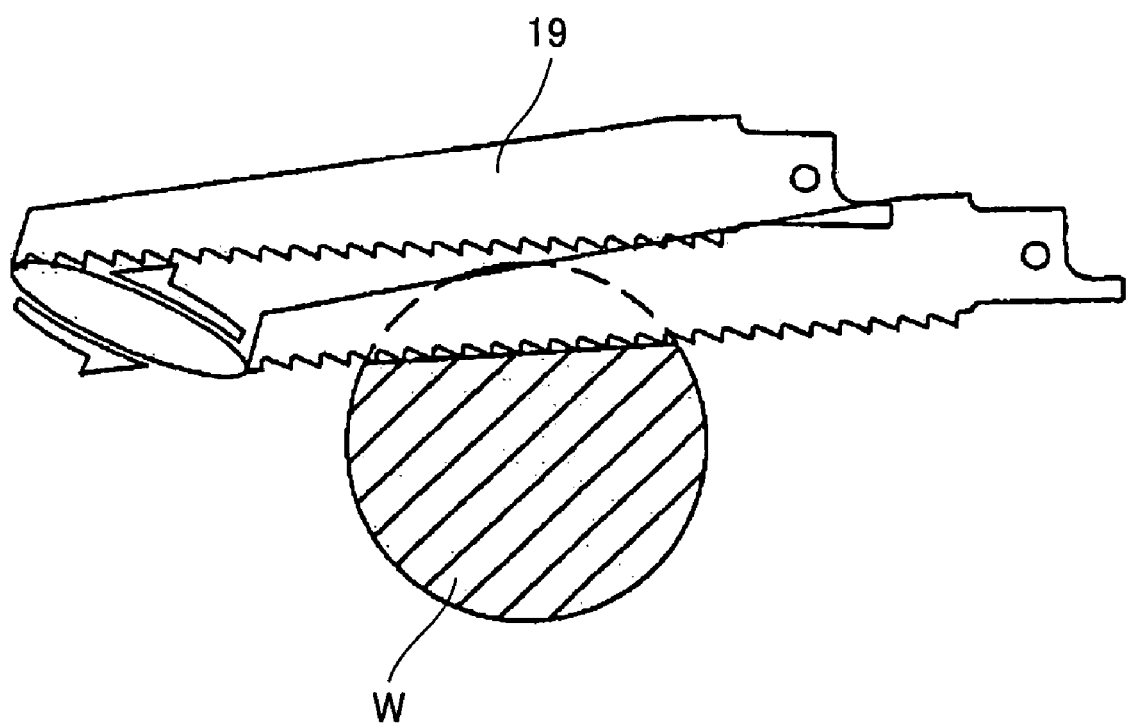
FIG. 17 is an explanatory view for description of a moving locus of a blade of the conventional saber saw.

FIG. 15 shows the state in which the blade 19 is at the most retracted position into the third housing 6. When the plunger 20 moves forward from the most retracted position, the pivot angle of the plunger chip 326 about the axis of the stepped bolt 27 in the direction of the arrow A shown in FIG. 15 is increased due to the biasing force of the torsion spring 29 since the pivot axis of the stepped bolt 27 gradually gets near to the roller 43. Thereafter, when the plunger 20 moves backward from this state, the plunger chip 326 gradually pivots in the direction of the arrow B against the biasing force of the torsion spring 29 since the pivot axis of the stepped bolt 27 gradually moves away from the roller 43. Thus, the tooth side 19a thrusts into a workpiece to promote cutting.

Thus, in the saber saw 301 according to the fourth embodiment, since the second inclined motion regulating portion is configured by the upper surface of the blade holder 331 itself, corresponding to the back side 19b of the blade 19. That is, the second inclined motion regulating portion is provided by the outer surface of the blade holder 331 itself that extends along the axial direction of the plunger 20. Therefore, the second inclined motion regulating portion need not be of special configuration, thereby providing a the inclined motion mechanism with a simple structure. Furthermore, since the first inclined motion regulating portion is configured by the roller 43, and the roller 43 is in direct contact with the outer surface of the blade holder 331. Therefore, when the plunger 20 reciprocates in its axial direction, the roller 43 is in rolling contact with the blade holder 331. Thus, moving resistance of the blade holder 331 can be reduced by the rotation of the roller 43.

While the invention has been described in detail with reference to specific embodiments thereof, it would be apparent to those skilled in the art that various changes and modifications may be made therein without departing from the spirit and scope of the invention. For example, in the above embodiments, the blade holding portions 25, 125, 225,325, which are located ahead of the plunger 20, attachment and detachment of the blade 19 is performed by pivoting the pressure lever 35. However, a bolt can be used instead of the pressure lever 35.

Further, in the above first to fourth embodiments, the saber saw can be configured so that the blade 19 can be held by the blade holding portion even if the tooth side 19a and the back side 19b are inverted. In the latter case, in the first and fourth embodiments, the front end of the third housing 6 can be configured so that the roller holder can be selectively fixed to the third housing at either one of the positions corresponding to the tooth side 19a as well as the back side 19b of the blade 19. Thus, the roller holder can be selectively fixed depending on the side of the tooth of the blade 19. On the other hand, in the second and third embodiments, the front end of the third housing can be configured so that the inclined guide surfaces 143 are formed at the third housing at both positions corresponding to the tooth side 19a as well as the back side 19b of the blade 19. Under these configurations, sawing operation with the sawtooth directed downward as well as upward becomes possible, and in both cases, the leading end of the blade 19 can pivot toward a workpiece when the blade 19 is retractingly moved toward the housing. Furthermore, also the back side 19b of the blade 19 can also be provided with sawtooth.

Further, in the first embodiment, the second track 31B is a flat surface parallel with the axis of the plunger 20. On the other hand, the second track 31B can also be tapered whose oblique angle is different from that of the first track 31A.

Further, in the first embodiment, with respect to at least one of the first and second tracks, a plurality of tracks can be prepared with their oblique angles made different from one another, and these tracks are detachably arranged on the blade holder so as to provide an optimum pivot angle of the blade depending on a workpiece.

Similarly, in the second and third embodiments, a plurality of guide segments each having an inclined guide surface can be prepared. Each inclined guide surface has an oblique angle made different from one another, and the guide segment can be removably arranged independently of the third housing so as to provide an optimum inclined guide surface for an optimum pivot angle of the blade depending on a workpiece.

What is claimed is:

1. A saber saw having a linear blade having one longitudinal side and another longitudinal side, teeth being formed at least at the one longitudinal side for cutting a workpiece, the saber saw comprising:
 a housing having a front side;
 a drive source disposed in the housing;

a plunger linearly reciprocally movably supported in the housing, the plunger having a front side, the reciprocating direction of the plunger being only an extending direction of the plunger;

a conversion mechanism for converting a rotation of the motor into a reciprocating motion of the plunger;

a blade holding portion having a rear side pivotally movably connected to the front side of the plunger for holding a rear portion of the blade; and an inclined motion mechanism that forces a leading end portion of the blade to be inclined toward the workpiece when the blade is retractingly moved into the housing, the blade holding portion being pivotally moved in a direction of the inclination of the leading end portion of the blade, the inclined motion mechanism comprising:

a first inclined motion regulating portion provided at an inner peripheral surface of the front side of the housing and at a side corresponding to the another longitudinal side of the blade; and a second inclined motion regulating portion disposed at the blade holding portion and abutable on the first inclined motion regulating portion for regulating a pivot angle of the blade holding portion with respect to the plunger when the blade is retractingly moved into the housing while the blade is subjected to reaction force from the workpiece as a result of actual cutting.

2. The saber saw as claimed in claim 1, wherein the inclined motion mechanism further comprises a biasing member interposed between the blade holding portion and the front side of the plunger for urging the blade holding portion to be pivotally moved to the another longitudinal side of the blade.

3. The saber saw as claimed in claim 1, wherein the first inclined motion regulating portion comprises a roller rotatably supported to an inner peripheral surface of the front side of the housing; and wherein the second inclined motion regulating portion comprises a first track extending in an axial direction of the plunger and protruding from a side of the blade holding portion toward an inner peripheral surface of the housing, the side of the blade holding portion corresponding to the another longitudinal side of the blade, the first track having a first track surface contactable with the roller and the first track providing a protruding amount gradually smaller toward the rear side of the blade holding portion.

4. The saber saw as claimed in claim 3, wherein the housing is formed with a first female thread and a second female thread arrayed with each other in a thickness direction of the blade; and wherein the first inclined motion regulating portion further comprises:

a roller holder for rotatably supporting the roller to the housing, the roller holder being formed with a through hole; and a fixing screw extending through the through hole and selectively threadingly engageable with one of the first female thread and the second female thread, the first track surface being confrontable with the roller when the fixing screw is threadingly engaged with the first female thread; and wherein the second inclined motion regulating portion further comprises a second track extending in parallel with the first track and at a position confrontable with the roller when the fixing screw is threadingly engaged with the second female thread.

5. The saber saw as claimed in claim 1, wherein the first inclined motion regulating portion comprises a guide surface portion provided at the front side of the housing, the guide surface portion defining a guide surface gradually spaced away from an axis of the plunger toward a distal front end of the housing; and wherein the second inclined motion regulating portion comprises a roller rotatably supported to the blade holding portion and in contact with an inner peripheral surface of the housing.

6. The saber saw as claimed in claim 1, wherein the first inclined motion regulating portion comprises a guide surface portion provided at the front side of the housing, the guide surface portion defining a guide surface gradually spaced away from an axis of the plunger toward a distal front end of the housing; and wherein the second inclined motion regulating portion comprises a projection projecting from a side of the blade holding portion toward an inner peripheral surface of the housing, the side of the blade holding portion being corresponding to the another longitudinal side, the projection being in sliding contact with the guide surface.

7. The saber saw as claimed in claim 1, wherein the first inclined motion regulating portion comprises a roller rotatably supported to an inner peripheral surface of the front side of the housing; and wherein the blade holding portion has a local outer peripheral surface extending in an axial direction thereof and at a side corresponding to the another longitudinal side, the local outer peripheral surface functioning as the second inclined motion regulating portion contactable with the roller.

\* \* \* \* \*